Patented July 7, 1925.

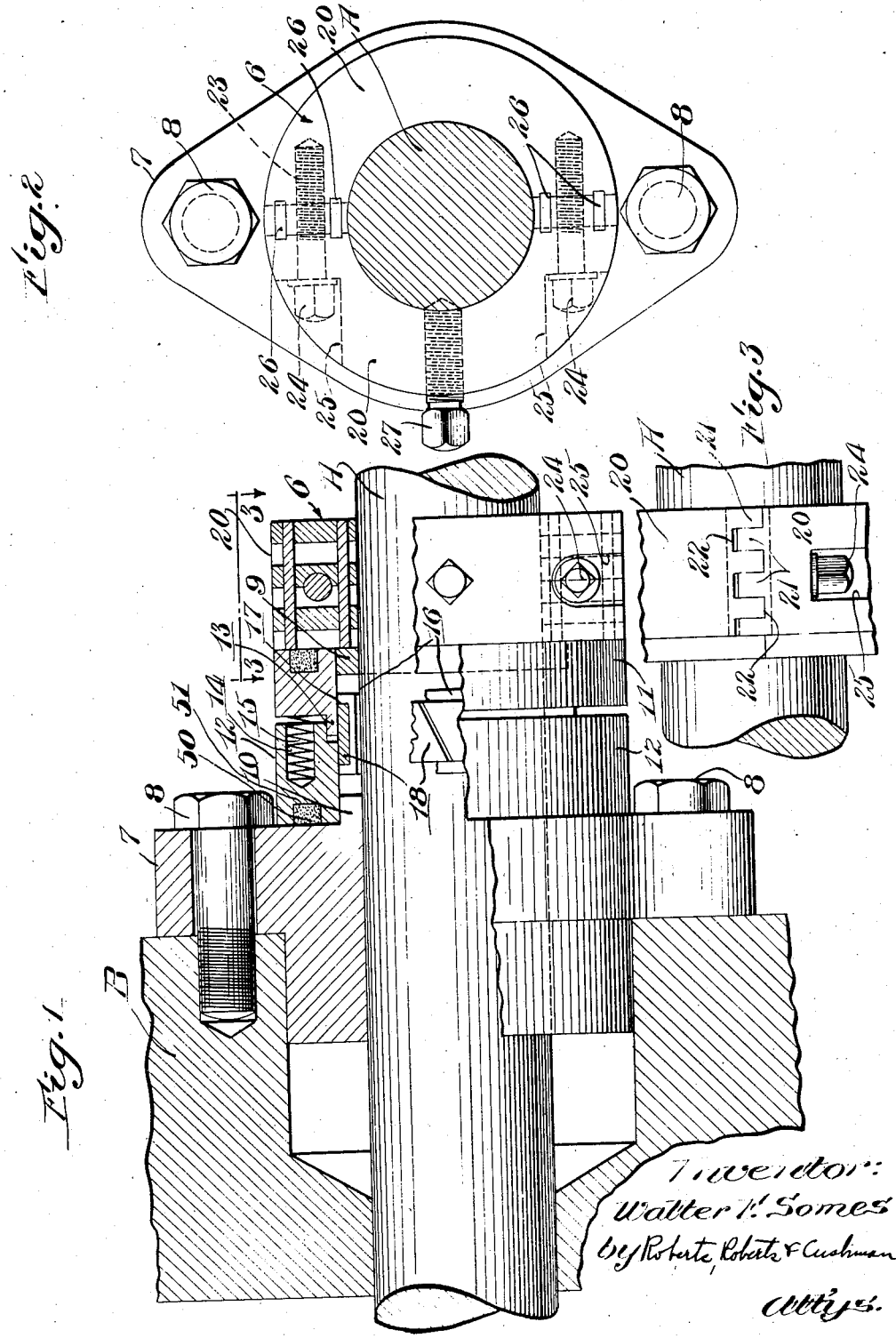

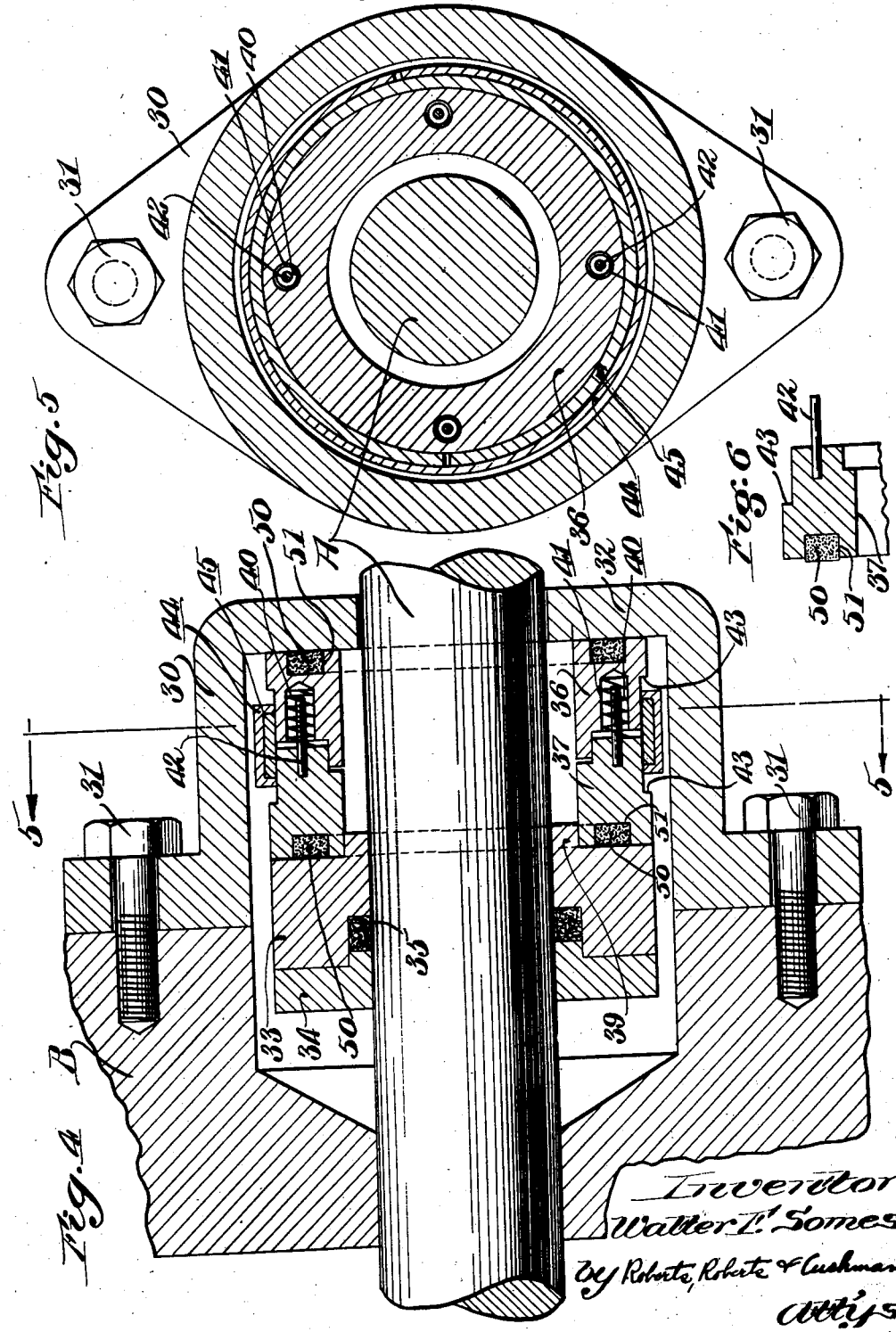

1,544,609

UNITED STATES PATENT OFFICE.

WALTER F. SOMES, OF JAMAICA PLAIN, MASSACHUSETTS.

SHAFT PACKING FOR TURBINES AND THE LIKE.

Application filed October 31, 1922. Serial No. 598,141.

*To all whom it may concern:*

Be it known that I, WALTER F. SOMES, a citizen of the United States of America, and resident of Boston, Jamaica Plain, in the county of Suffolk and State of Massachusetts, have invented new and useful Improvements in Shaft Packings for Turbines and the like, of which the following is a specification.

This invention relates to packings for rotatable shafts of the type adapted to withstand high pressures without leakage and particularly intended for use in connection with turbine shafts.

Objects of the invention are to provide a packing of the above type characterized by efficient operation over long periods of time without appreciable wear of the parts and without the necessity for frequent adjustments or in fact for any adjustments at all, and in general to improve prior devices in the interests of satisfactory service.

The invention comprises spaced abutments on the shaft and shaft casing respectively and two annular packing members or rings mounted between the abutments, either of which rings may be integral with the adjacent abutment. Suitable means such as springs are utilized to urge the rings apart. The resulting crack or gap between the rings is sealed by suitable means, such as telescopic parts integral with the rings or an annular member having telescopic engagement with both rings or both. Each separate ring may also have telescopic engagement with its associated abutment. Wear between the rings and the abutments is reduced to a minimum by suitable lubricant packing.

The invention further comprises a novel form of collar or sleeve in a plurality of parts adapted to be mounted upon a shaft in a manner to prevent leakage of fluid under pressure and to serve as an abutment for suitable packing members.

The genus of the invention is illustrated by the concrete embodiments shown in the accompanying drawings, in which:

Fig. 1 is a view longitudinally of a shaft partly in elevation and partly in section showing one embodiment of the invention.

Fig. 2 is an end elevational view from the right of Fig. 1;

Fig. 3 is a partial plan view substantially on the line 3—3 of Fig. 1 of the shaft abutting it;

Fig. 4 is a longitudinal sectional view showing another embodiment of the invention;

Fig. 5 is a sectional view on the line 5—5 of Fig. 4; and

Fig. 6 is a fragmentary sectional view of one of the rings showing the lubricant packing as first inserted and prior to wear.

The embodiment of the invention shown in Fig. 1 is illustrated as applied to produce a tight joint around a turbine shaft A, the packing being interposed between a fixed abutment 6 on shaft A, and an abutment 7 in the form of a cap fast to the shaft or turbine casing B by any suitable means as by the bolts 8. Abutments 6 and 7 are spaced as shown and have opposed flanges 9 and 10 respectively. Interposed between abutments 6 and 7 and in telescoping engagement with the flanges 9 and 10 are packing members or rings 11 and 12 of any suitable material such as Babbitt-metal. Rings 11 and 12 have telescoping engagement with each other by virtue of a projecting flange 13 on ring 11 fitted in a complemental recess 14 in ring 12. Rings 11 and 12 as shown are loosely mounted between the abutments for axial movement relative to each other. The rings are pressed outwardly against abutments 6 and 7 to make a tight joint by any suitable means preferably by springs 15 interposed between the two rings and arranged to force them apart. Under certain conditions springs 15 may offer sufficient frictional resistance to prevent relative rotative movement of the rings, and to cause them to act as a unit so that the rings may remain stationary with abutment 7 or turn as a unit with abutment 6, or turn in the direction of abutment 6 at a lower speed. Manifestly the rings may be keyed together in any well known manner although allowing relative axial movement thereof. In case the telescopic engagement of rings 11 and 12 with each other is insufficient to seal the crack or gap between the rings, any suitable means for this purpose may be provided such as an annular member 16 in the form of a split packing ring in telescopic engagement with both rings and having a broad peripheral groove 17 in which a second split ring 18 seats with a tight fit. Member 16 is the more resilient and exerts the greater outward pressure. Member 16 is retained in proper position to seal the crack between the rings by flanges 9 and 10 which serve as abutments for this member.

One form of abutment member 6 which can be readily mounted upon a shaft such as shaft A and prevent leakage therearound, is disclosed in Figs. 1, 2 and 3. This member comprises a plurality of arcuate parts 20, in this case two in number, which are shaped on their inner sides to fit tightly about shaft A. The meeting ends of parts 20 are arranged to interfit by the provision of alternate lugs 21 and recesses 22, the parts being held in interfitting relation by means of bolts 23, access to the heads 24 of which for the purpose of setting up or loosening the bolts being provided by cutting away or recessing one of parts 20 at 25. The irregular joint between the parts 20 produced by the interfitting lugs 21, is sealed by any suitable means such as keys 26 axially disposed and fitting in recesses in both of parts 20, which recesses extend transversely of the circumferentially disposed lugs 21. As indicated in Fig. 3 by the broken lines, keys 26 extend beyond the joint on both sides thereof so that a tight seal is insured.

In the embodiment of the invention shown in Figs. 4 and 5 the packing is mounted within the pressure chamber instead of upon the outside as illustrated by the first embodiment. The packing is enclosed by cap 30 fast to the shaft or turbine casing B by bolts 31. Inwardly disposed flange 32 of cap 30 serves as the stationary abutment for the packing, and within the recess provided by cap 30, and in spaced relation to flange 32 thereof, is an abutment upon the shaft A. This abutment comprises rings 33 and 34 having a pressed fit with shaft A and having packing 35 compressed therebetween to prevent leakage. Loosely mounted between flange 32 and abutment ring 33 are packing rings 36 and 37 having telescoping engagement with each other at 38. The inner ring 37 also has telescoping engagement with abutment 33 by reason of a flange 39 thereon, while ring 36 abuts flange 32. For the purpose of pressing the packing rings 36 and 37 apart and into engagement with their respective abutments to make a tight joint therewith, springs 40 are provided interposed between the rings and housed in suitable recesses 41 in one of the rings. To insure the operation of rings 36 and 37 as a unit in all rotative movements, positive means for effecting this result may be provided in the form of pins 42 fast on ring 37 and extending into suitable recesses in ring 36 which may be the spring recesses 41. The outer annular faces of rings 36 and 37 are reduced providing shoulders 43, serving as retainers for an annular split packing 44 having a second split packing 45 received in a suitable groove or recess on its inner face and adapted to seal the crack between the two packing rings, packing 44 being arranged to exert the greater pressure upon the telescoped portions of rings 36 and 37.

In both forms of the invention herein disclosed means are provided for preventing or at least reducing to a minimum the wear between the rings 11, 12, 36 and 37 and their respective abutments 6, 7, 32 and 33. The means best adapted for this purpose comprises a lubricant packing 50 arranged between the engaging surfaces. The packing 50 is in the form of a ring comprising graphite mixed with a suitable binder and forced into shape under heavy pressure, the binder being thereafter removed as by burning in the electric furnace. The graphite packing 50 seats in a groove 51 in one of each pair of engaging surfaces, preferably in the rings 11, 12, 32 and 33 as shown. The lubricant packing ring 50 is of a size to protrude slightly from its groove 51 when first inserted as shown in Fig. 6 so that the initial wear comes upon the packing. As this is worn down the graphite particles become deposited upon the adjacent engaging surfaces of the rings and their abutments forming a graphite coating which in time, as is well known, is partly assimulated by the metal producing hard glass-like carbonized surfaces which resist to a high degree the effects of frictional contact even at very high speeds.

It will be clear from an examination of the drawings that the packing rings of each modification are retained in engagement with their respective abutments by means of the springs interposed between the rings, and that there is no unbalanced steam pressure adapted to control the movements of the packing rings. In the embodiment shown in Fig. 1 the steam pressure upon shaft A has no effect whatever upon the movements of rings 11 and 12 in an axial direction. In the embodiment shown in Fig. 4 the pressure upon rings 36 and 37 is balanced by shoulders 43 which are of equal extent. Hence, undue wear of the packing rings caused by the latter being forced against the abutments by unbalanced steam pressure is entirely avoided.

It will be further apparent that by accurately gauging the strength of the springs 15, or 41, the packing rings may be forced apart and into engagement with their abutments and held there with a steady pressure insuring a tight joint, and that any leakage between the rings is entirely avoided by the packing members 16, 18 or 44, 45.

The demountable collar or abutment 6 of the shaft disclosed in Figs. 1, 2 and 3, has the advantage of being readily applied or removed from the shaft at any time by the simple expedient of using a wrench upon screw bolts 24. Under normal conditions where the parts are accurately made, a fluid tight joint between the shaft and the abutment or collar is made, and the collar will not turn upon the shaft. If desired, however, a set screw 27 may be used to prevent any possibility of such movement.

From the above it will be apparent that the packing herein disclosed is adapted to withstand the heavy pressures encountered in turbines without leakage for an indefinite period by reason of the slight wear of the parts due to the utilization of light springs for applying pressure to the lubricant packings between the engaging surfaces of the rings and their abutments, and to the avoidance of unbalanced steam pressure, and that the loose mounting of a single packing ring or of two packing rings between the abutments under relatively light pressure permits the rings to seat and to maintain an accurate bearing surface.

I claim:

1. A packing for turbine shafts and the like comprising abutments on the shaft and shaft casing respectively, a pair of packing rings between said abutments having telescoping parts, said rings being arranged to rotate as a unit independently of said abutments, spring means urging said rings apart into engagement with said abutments, and interengaging packing members to seal the crack between said rings.

2. A packing for turbine shafts and the like comprising abutments on the shaft and shaft casing respectively, a pair of packing rings between said abutments arranged to rotate independently thereof, spring means between said rings for urging them into engagement with said abutments, and a pair of telescoping packing members to seal the crack between said rings, said members being constructed tightly to engage said rings to prevent the escape of fluid and to remain in proper position.

3. A packing for turbine shafts and the like comprising abutments on the shaft and shaft casing respectively, a pair of packing rings between said abutments arranged to rotate independently thereof, spring means urging said rings into engagement with said abutments, packing for sealing the crack between said rings, and antifriction packing between each ring and its respective abutment.

4. A packing for turbine shafts and the like comprising abutments on the shaft and shaft casing respectively, a pair of packing rings between said abutments arranged to rotate independently thereof, said packing rings being in telescopic engagement with each other and with adjacent abutments, spring means urging said rings into engagement with said abutment, packing for sealing the crack between said rings, and lubricant packing between each ring and its respective abutment.

5. In a packing for turbine shafts and the like, a rotatable abutment adapted to be secured upon a shaft to be engaged by a packing ring, said abutment comprising a plurality of members shaped to fit the shaft when united, means holding said members united, said members having circumferentially disposed complemental lugs and recesses at their meeting edges, and means for sealing their joints between said members comprising axially disposed packing members fitting in grooves in adjacent members and arranged to span said joints.

6. In a packing for turbine shafts and the like, a rotatable abutment adapted to be secured upon a shaft comprising an annular member in two parts, means securing the parts together, said parts having circumferentially disposed complemental lugs and recesses, and means for sealing the joints between said parts comprising members fitting in axially disposed slots extending transversely through said interfitting lugs.

Signed by me at Boston, Massachusetts, this twenty-first day of October, 1922.

WALTER F. SOMES.